(12) United States Patent
Hess et al.

(10) Patent No.: US 11,326,312 B2
(45) Date of Patent: May 10, 2022

(54) DRY-BULK TANKER, CONVEYING SYSTEM FOR A DRY-BULK TANKER, WORK TRAIN AND METHOD FOR CONVEYING BINDING AGENTS FOR A WORK TRAIN

(71) Applicant: Wirtgen GmbH, Windhagen (DE)

(72) Inventors: Frederic Hess, Montabaur (DE); Christoph Menzenbach, Neustadt (DE); Patrick Schiefer, Hennef (DE)

(73) Assignee: WIRTGEN GMBH

( * ) Notice: Subject to any disclaimer, the term of this patent is extended or adjusted under 35 U.S.C. 154(b) by 46 days.

(21) Appl. No.: 16/876,524

(22) Filed: May 18, 2020

(65) Prior Publication Data
US 2020/0385937 A1 Dec. 10, 2020

(30) Foreign Application Priority Data
Jun. 5, 2019 (DE) ...................... 10 2019 115 196.1

(51) Int. Cl.
*E01C 19/20* (2006.01)
*B65G 53/08* (2006.01)
*E01C 21/00* (2006.01)

(52) U.S. Cl.
CPC .......... *E01C 19/2035* (2013.01); *B65G 53/08* (2013.01); *E01C 19/205* (2013.01);
(Continued)

(58) Field of Classification Search
CPC .... E01C 19/2035; E01C 19/205; E01C 21/00; E01C 2019/208; B65G 53/08; B65G 2201/045
See application file for complete search history.

(56) References Cited

U.S. PATENT DOCUMENTS 1,864,612 A 6/1932 Pearson et al.
2,374,732 A * 5/1945 Colburn .............. E01C 19/1022
264/31
(Continued)

FOREIGN PATENT DOCUMENTS

DE 2939648 A1 4/1981
DE 2822052 C2 6/1982
(Continued)

OTHER PUBLICATIONS

U.S. Appl. No. 16/843,716, filed Apr. 8, 2020 (co-pending—not prior art).
(Continued)

*Primary Examiner* — Abigail A Risic
(74) *Attorney, Agent, or Firm* — Lucian Wayne Beavers; Patterson Intellectual Property Law, PC (57) ABSTRACT

A dry-bulk tanker for the provision of binding agent for soil stabilization for a spreading device, comprising a storage container (10) for binding agent. An intermediate chamber (20) is connected to the storage container and is also connected to a compression chamber (40). A conveying device (22) for conveying of binding agent into the compression chamber (40) is arranged in the intermediate chamber (20). A conveying channel (44) is connected to the compression chamber (40). The conveying channel (44) can be connected to a spreading device (58). Furthermore, a pneumatic line (46) for feeding of conveying compressed air is connected to the compression chamber (40) and/or the conveying channel (44).

23 Claims, 4 Drawing Sheets

(52) U.S. Cl.
CPC ........ *E01C 21/00* (2013.01); *B65G 2201/045* (2013.01); *E01C 2019/208* (2013.01)

(56) References Cited

U.S. PATENT DOCUMENTS

| | | | | |
|---|---|---|---|---|
| 2,487,503 | A * | 11/1949 | Witter | E01C 19/205 406/42 |
| 3,777,658 | A * | 12/1973 | Vosskuhler | B30B 11/24 100/98 R |
| 4,529,104 | A * | 7/1985 | Tyler | A01C 15/04 222/146.2 |
| 5,096,125 | A * | 3/1992 | Wise | E01C 19/21 239/675 |
| 5,096,336 | A | 3/1992 | Merrett et al. | |
| 5,931,393 | A * | 8/1999 | Alsip | E01C 19/205 239/654 |
| 6,349,658 | B1 * | 2/2002 | Tyer | B01D 53/02 110/101 CD |
| 8,511,933 | B2 | 8/2013 | Menzenbach et al. | |
| 10,260,208 | B1 * | 4/2019 | Dillingham | E01C 23/06 |
| 10,619,322 | B2 | 4/2020 | Menzenbach et al. | |
| 10,721,876 | B1 * | 7/2020 | Schmutz | A01C 15/04 |
| 2005/0161451 | A1 | 7/2005 | Maginot et al. | |
| 2012/0321421 | A1 | 12/2012 | Lavoie | |
| 2017/0355534 | A1 | 12/2017 | Hunt | |
| 2019/0063008 | A1 * | 2/2019 | Benesch | E01C 19/2025 |
| 2019/0194896 | A1 | 6/2019 | Menzenbach et al. | |

FOREIGN PATENT DOCUMENTS

| | | |
|---|---|---|
| DE | 3910617 A1 | 10/1990 |
| DE | 202008012104 U1 | 3/2010 |
| DE | 102009008884 A1 | 8/2010 |
| DE | 102012021421 A1 | 4/2014 |
| EP | 1557376 A1 | 7/2005 |
| EP | 2388217 A1 | 11/2011 |

OTHER PUBLICATIONS

International Search Report for corresponding EP 20178072, dated Oct. 15, 2020, 2 pages (not prior art).

European Office Action for parallel patent application No. 20178072.3, dated Oct. 25, 2021, 7 pages (not prior art).

* cited by examiner

DRY-BULK TANKER, CONVEYING SYSTEM FOR A DRY-BULK TANKER, WORK TRAIN AND METHOD FOR CONVEYING BINDING AGENTS FOR A WORK TRAIN

BACKGROUND OF THE INVENTION

Field of the Invention

The invention relates to a dry-bulk tanker for the provision of binding agents for soil stabilization for a spreading device as well as to a conveying system for a dry-bulk tanker. The invention further relates to a work train for working soils with a self-propelled ground working machine and a dry-bulk tanker. Furthermore, the invention relates to a method for conveying of binding agent for a work train having a self-propelled ground working machine and a dry-bulk tanker.

Description of the Prior Art

An improvement or stabilization of soils can be effected in particular by means of dry binding agent such as, for example, lime or cement. To this end, the binding agent is introduced into the soil in order to, in particular, increase the load-bearing capacity of the same. Soil stabilization is performed in particular in the construction of roads or railway lines as well as in the construction of industrial sites.

Binding agent spreaders are known for the purpose of spreading binding agent. Such vehicles comprise a large container for the reception of binding agent. The spreading of binding agent is effected in such a manner that the spreading vehicle drives ahead of the stabilizer or recycler. An upper layer of a surface to be stabilized is milled off by the stabilizer or recycler by means of, for example, a milling/mixing drum, the milled-off material is optionally mixed with further material and spread again. The binding agent spread by the binding agent spreader ahead of the stabilizer or recycler is also picked up as part of this process. It is of disadvantage with such binding agent spreaders driving ahead that the binding agent may drift. This increases the costs as a result of the increased material requirement and leads to dust exposure for the workers and residents.

Moreover, stabilizers and recyclers are known which comprise a binding agent spreader. Such a stabilizer or recycler with integrated binding agent spreader is known, for example, from DE 10 2009 008 884. It is hereby possible for the binding agent to be spread, for example, directly ahead of the milling/mixing rotor so that the binding agent is picked up immediately by the milling/mixing rotor. In this process, there is no hazard of drifting. On the other hand, such stabilizers or recyclers with integrated binding agent container have the disadvantage that such a binding agent container has a small filling volume and must therefore be filled regularly. The filling of such a binding agent container is effected by means of a dry-bulk tanker. Binding agent is fed from the dry-bulk tanker to the binding agent container of the stabilizer or recycler at regular intervals. Feeding is effected, for example, pneumatically. To this end, the binding agent container of the dry-bulk tanker is pressurized for the filling process. Filling the container of the stabilizer or recycler while driving is possible to a limited extent only.

A work train comprising a dry-bulk tanker and a milling vehicle is known from DE 20 2008 012 104. The milling vehicle comprises a storage container for dry bulk material, such as a binding agent. Said container comprises a small volume and is thus filled permanently by the dry-bulk tanker. In this arrangement, the dry-bulk tanker is designed in such a manner that it is not necessary to pressurize the entire binding agent container of the dry-bulk tanker. Rather, a mechanical transport device is arranged inside the binding agent container of the dry-bulk tanker which conveys the dry bulk material into a chamber by means of, for example, a conveying screw. From the chamber, the dry bulk material is thereupon conveyed to the storage container of the milling vehicle pneumatically via a transport line. However, it is of disadvantage in this design that, due to the pneumatic conveying process, a swirling of the binding agent takes place also inside the binding agent container of the dry-bulk tanker. This may lead to an inconsistent feed of binding agent to the storage container of the milling vehicle. Furthermore, there is the disadvantage that an increased dust formation occurs inside the dry-bulk tanker. This leads to higher loads of the filter systems and may furthermore also give rise to malfunctions of sensors, in particular of filling level sensors arranged inside the dry-bulk tanker.

Furthermore, a problem is that the binding agent has to be conveyed from the dry-bulk tanker to the ground working machine through a hose which is optionally relatively long. The hose can have a length of approx. 10 m. This leads to the fact that the quantity of binding agent conveyed to the ground working machine or to the storage or buffer container of the ground working machine, respectively, is optionally not sufficient. This is particularly related to the fact that the conveying volume varies widely depending on the type of the biding agent used, its specific weight, its age etc. As the conveying process in the hose is normally effected pneumatically, here it is also a problem that optionally a part of the air flow towards the conveying system, i.e. towards the dry-bull tanker, is deflected and thus negatively affects the conveying process of the binding agent through the screw conveyor or the like.

SUMMARY OF THE DISCLOSURE

An object of the invention is to create a dry-bulk tanker for the provision of binding agent for soil stabilization for a spreading device with which a reliable feed of binding agent is possible, as well as to create a corresponding work train. A further object of the invention is to create a corresponding conveying system for a dry-bulk taker and a corresponding method for conveying of binding agent for a work train.

The object according to the present invention is achieved by a dry-bulk tanker, a conveying system for a dry-bulk tanker, a work train for working soils such as roads, railway lines, industrial sites etc. by means of a ground working machine and a dry-bulk tanker, as well as by a method for conveying of binding agent for a work train.

The dry-bulk tanker is used, in particular, to fill a binding agent container of a ground working machine, such as a stabilizer or recycler, as described, for example, in DE 10 2009 008 884. The dry-bulk tanker according to the present invention for the provision of binding agent for soil stabilization with a spreading device comprises a storage container for the binding agent. An intermediate chamber is connected to the storage container and is then connected to a compression chamber. A conveying device is provided in the intermediate chamber with which binding agent is conveyed into the compression chamber. Thereupon, a conveying channel is connected to the compression chamber, the conveying channel being a flexible hose, for example. The conveying channel is adapted to be connected to the spreading device, wherein the spreading device is preferably part of a ground working machine. Moreover, the dry-bull tanker according to the invention comprises a pneumatic line, which is connected to the compression chamber and/or the conveying channel, for feeding of conveying compressed air into the conveying channel and for thus conveying the binding agent to the spreading device. Due to providing, according to the invention, a compression chamber which is connecting to the intermediate chamber, it is ensured that the conveying compressed air does not flow or only to a small part flows into the intermediate chamber. Here, the compressed binding agent serves as a kind of sealing. In this respect, the conveying compressed air is used entirely or at least almost entirely for conveying the binding agent towards the spreading device. Moreover, it is prevented that conveying the binding agent into the intermediate chamber is negatively affected when the conveying compressed air enters the intermediate chamber.

Preferably, the compression chamber is designed to have a cross-section being tapered in conveying direction. The conveying direction of the binding agent is from the intermediate chamber into the compression chamber and from the compression chamber into the conveying channel. The cross-section tapering already leads to an automatic compression of the binding agent since the conveying device provided in the intermediate chamber preferably conveys a constant quantity of binding agent. Additionally, a compression device can be provided.

Furthermore, it is preferred that the conveying channel comprises an angle being different than 0° in its longitudinal direction, which may be referred to as a conveying channel longitudinal direction, at an outlet of the compression chamber towards the conveying channel longitudinal direction. In said preferred embodiment, the conveying channel is thus not coaxial to a compression chamber longitudinal direction of the compression chamber. Therefore, the binding agent is forcibly deflected. This leads to a backing-up and thus to a compression of the binding agent in the compression chamber. Preferably, the angle is larger than 0°, wherein an angle of 0° is defined as coaxial. It is preferred that the angle is larger than 50°. Particularly preferred is an angle of 90° or more. The compression due to the deflection can here be provided independent of the provision of a compression chamber with a tapering cross-section. However, it is also possible to combine these two embodiments.

In a preferred development of the invention, the pneumatic line is connected to the conveying channel such that the conveying compressed air flows into the conveying channel substantially in longitudinal direction thereof. With such a substantially coaxial inflow of compressed air a good conveying capacity can be achieved.

In a preferred embodiment, the conveying device arranged in the intermediate chamber is a mechanical conveying device, in particular a screw conveyor.

For compression of the binding agent, it is preferred to arrange a compression device in the intermediate chamber and/or the compression chamber for compressing the binding agent in the compression chamber. For this purpose, a mechanical compression device, such as a compression screw, is again preferred and optionally comprises a separate drive. It is particularly preferred that the compression device is formed by a part of the conveying device. The compression is in particular carried out by an end region of the conveying device, wherein the end region is the region being arranged at the end of the conveying device. In this respect, it is particularly preferred that the conveying device, which is arranged in the intermediate chamber and is a screw conveyor in a particularly preferred embodiment, at the same time also serves as a compression device in its end region. Preferably, the conveying device protrudes into the compression chamber.

For causing a compression of the binding agent in particular in the end region of the conveying device, a reducing spindle distance, i.e. pitch of the screw, can be provided in a screw conveyor, particularly in the end region. The binding agent is compressed by reducing the spindle distance. In a preferred development, the screw conveyor can be designed, particularly in the end region, in such a manner that an additional spindle is provided, so that the screw conveyor is a double flight conveyor. Said additional spindle is in particular arranged between the spindle of the screw conveyor. A spindle with two flights or with multiple flights can hereby be formed. This in turn leads to a good compression of the binding agent, particularly in the end region of the screw conveyor and thus particularly in the compression chamber.

In a further preferred embodiment of the dry-bulk tanker according to the invention, an inlet opening of the intermediate chamber, which is indirectly or directly connected to the storage container, is adapted to be partially closed with a cover element. In particular, the cover element can be provided in conveying direction of the conveying device arranged in the intermediate chamber in the central and/or end region of the conveying device. In doing so, the quantity of binding agent can be set which is fed from the conveying container of the intermediate chamber and thus to the conveying device. By providing such a cover element, a compression chamber can be formed in the intermediate chamber or a compression chamber connecting to the intermediate chamber can be enlarged. It is hereby possible to adjust the size and/or design of the compression chamber to the binding agent and/or a binding agent condition. The cover can, for example, also comprise openings such that in the region of the cover a small quantity of binding agent is fed to the intermediate chamber or trickles through the opening of the covers, respectively.

In a further preferred embodiment of the invention, a closing element is arranged between the compression chamber and the conveying channel. The closing element is used to modify the passage cross-section or the cross-section of the outlet opening of the compression chamber, respectively. It is hereby again possible to modify the compression in the compression chamber or to adapt it to the binding agent or the condition of the binding agent, respectively. Alternatively, or additionally, the closing element can also serve for directing the binding agent flow and/or for directing the conveying compressed air flow. The closing element is in particular designed in such a manner that it can be easily exchanged and/or modified in its position, for example according to a slide gate.

The binding agent can be conveyed from the storage container into the intermediate chamber by way of gravity. It is preferred that an additional conveying device for conveying the binding agent from the storage container into the intermediate chamber is provided between the storage chamber and the intermediate chamber. The additional conveying device is in particular a mechanical conveying device.

The mechanical additional conveying device is, for example, a gravity conveyor. In this design, conveying of the binding agent may be effected, in particular, based on the own weight, wherein conveying of the binding agent may also be assisted, for example, by a screw conveyor or the like.

In a particularly preferred embodiment, the mechanical additional conveying device is a rotary feeder. Said rotary feeder comprises, in particular, a plurality of conveying chambers arranged about an axis of rotation. Binding agent enters a conveying chamber open in the direction of the storage container by way of gravity or by means of a further conveying device. The respective conveying chamber is thereupon rotated further by the rotary feeder until the binding agent in the respective chamber continues from the same into the intermediate chamber due to gravity. With the aid of a rotary feeder, it is possible, in particular, to realize a continuous conveying of binding agent from a plurality of conveying chambers arranged about an axis of rotation.

The invention furthermore relates to a conveying system for a dry-bulk tanker. This is a separate invention which, in a preferred development, is suitable in particular for the dry-bulk tanker described above. The conveying system according to the present invention comprises an intermediate chamber being connected to a compression chamber. Moreover, the intermediate chamber can be connected to the storage container of a dry-bulk tanker. A conveying device for conveying binding agent into the compression chamber is arranged in the intermediate chamber. Furthermore, a conveying channel is connected to the compression chamber, and is also connectable to the spreading device. A pneumatic line for feeding of conveying compressed air is connected to the compression chamber and/or the conveying channel.

The individual constructional elements of the conveying system are advantageously developed as described above with reference to the dry-bulk tanker. In a preferred embodiment, the conveying device comprises, in particular, as described above, an advantageously developed compression chamber and/or a compression device and/or a respectively designed conveying device.

The invention furthermore relates to a work train for working soils which are, for example, roads, railway lines, industrial sites, or the like. The work train comprises an, in particular, self-propelled ground working machine such as a stabilizer or recycler. The ground working machine comprises a milling/mixing rotor inside a rotor housing. Furthermore, the ground working machine comprises a spreading device for spreading binding agent. The spreading device is connected to the dry-bulk tanker so that binding agent can be fed from the dry-bulk tanker to the spreading device in particular during the operation. In this arrangement, the dry-bulk tanker is designed as described above and preferably advantageously developed. The spreading device preferably comprises a buffer container for binding agent, wherein the buffer container is thereupon connected to the dry-bulk tanker via the conveying line. The maximum conveying rate of the binding agent in the conveying line, which is connected to the buffer container of the ground working machine, is preferably no less than 400 kg/min and, in particular, no less than 550 kg/min. The conveying volume is adjustable, in particular, to the requirements or to consumption, respectively.

Filling of the buffer container is preferably controlled from the ground working machine. This may be effected, for example, by means of appropriate filling level sensors in the buffer container. In this arrangement, filling of the buffer container may be effected continuously or intermittently.

The invention furthermore relates to a method for conveying of binding agent for a work train having a ground working machine and a dry-bulk tanker. According to the method of the present invention, conveying of binding agent is effected from a storage container of the dry-bulk tanker into an intermediate chamber. The binding agent is thereupon conveyed from the intermediate chamber into the compression chamber and compressed therein, wherein compressing can be effected in an advantageous manner, as described above with reference to the dry-bulk tanker. After compressing the binding agent, the binding agent is conveyed with the aid of conveying compressed air in a conveying channel to the ground working machine. The method according to the present invention, in particular as described with reference to the dry-bulk tanker, the conveying system and the work train, is advantageously developed.

Based on a preferred embodiment, the invention is hereinafter described in more detail with reference to the enclosed drawings.

BRIEF DESCRIPTION OF THE DRAWINGS

The following is shown.

DETAILED DESCRIPTION

The dry-bulk tanker comprises a storage container 10 for binding agent. The storage container 10 comprises, on an underside 12, an opening 14 which, in the embodiment presented, is connected via a funnel element 16 to a mechanical additional conveying device 18, wherein, in the embodiment presented, the additional conveying device 18 is a rotary feeder. The rotary feeder 18 is connected to an intermediate chamber 20.

From the storage container 10, binding agent enters the funnel element 16 through the opening 14. This is effected, in particular, by means of gravity, wherein a mechanical conveying device, such as a screw conveyor, a drag chain conveyor or the like, may optionally be additionally provided in the storage container 10, for example, to transport the binding agent to the opening 14 from an end of the storage container 10 remote from the opening 14. The binding agent slides through the funnel devices 16 into an upper conveying chamber which is in position 24 (FIG. 2) of the rotary feeder 18. The rotary feeder 18 rotates about an axis 21 in FIG. 2 in the direction of arrow 25. Thus, after the chamber in position 24 that is currently filled with binding agent, the chambers in positions 34 and 32 will be filled with binding agent. From the conveying chamber in position 30, which is arranged opposite the conveying chamber in position 24, the binding agent enters the intermediate chamber 20 due to gravity. The two conveying chambers in positions 32 and 34, connecting to the conveying chamber in position 30 as seen in the direction of rotation 25, are empty. The conveying chambers in positions 26 and 28 have already been filled with binding agent and are emptied into the intermediate chamber 20 successively with the continued rotation of the rotary feeder 18 in the direction of arrow 25.

Figure 1:
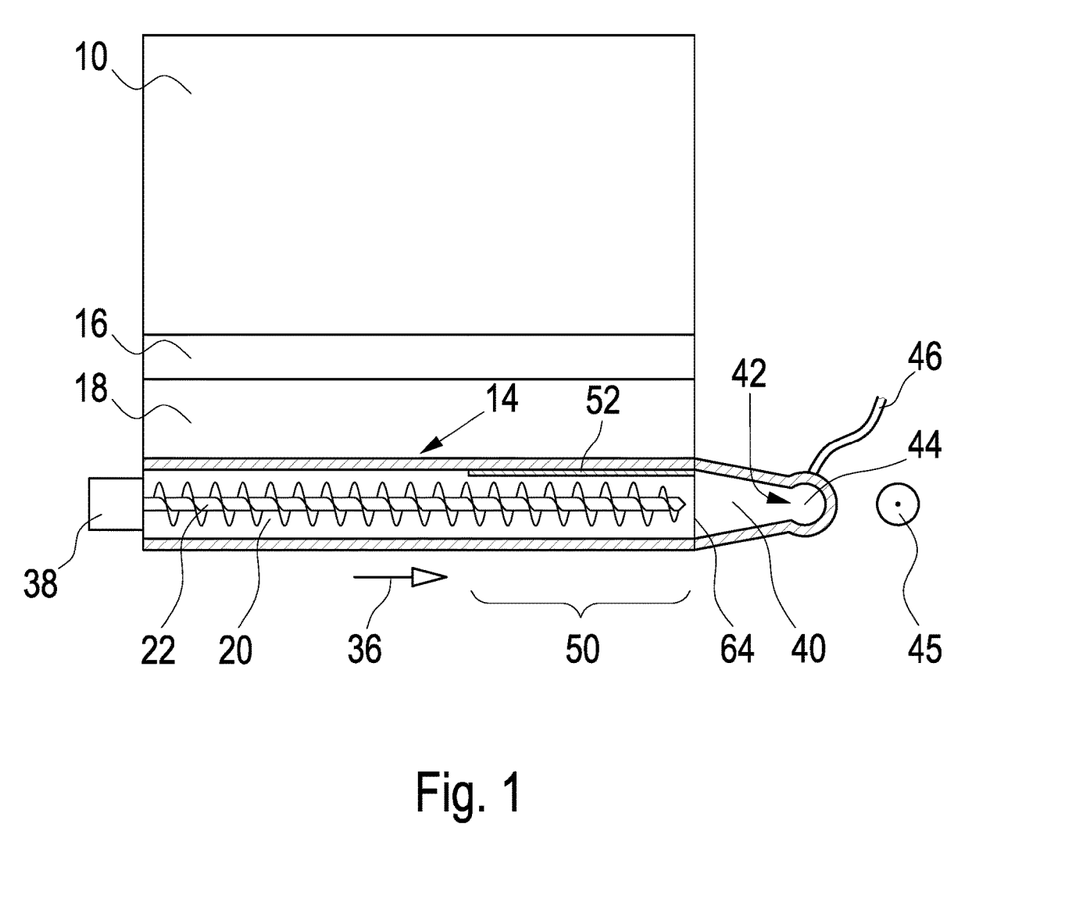
FIG. 1: a schematic rear view of a dry-bulk tanker.

The binding agent conveyed by the rotary feeder 18 enters the intermediate chamber 20. In said intermediate chamber 20, in the embodiment presented, a screw conveyor 22 is provided as a conveying device through which the binding agent in FIG. 1 is conveyed from left to right in conveying direction 36. The screw conveyor 22 is driven by an electric motor 38. The binding agent conveyed from the screw conveyor 22 in conveying direction 36 enters a compression chamber 40 following behind the conveying device. In the exemplary embodiment illustrated in FIG. 1, the compression chamber is designed in such a manner that it comprises a cross-section being tapered in conveying direction 36. Thus, the binding agent is compressed in the compression chamber 40.

A conveying channel 44 designed, for example, as a hose is connecting to an outlet 42 of the compression chamber 40. In the presented exemplary embodiment, a conveying channel longitudinal direction of the conveying channel 44 is at least in the region of the outlet 42 perpendicular to the drawing plane and thus in an angle of approx. 90° to the conveying direction 36. The conveying direction 36 may also be referred to as a compression chamber longitudinal direction of the compression chamber 40. For conveying the binding agent into the conveying channel 44, the latter is connected to a pneumatic line 46. The pneumatic line 46 is connected to the conveying channel 44 in the region of the outlet 42 such that conveying compressed air preferably flows into the conveying channel 44 in longitudinal direction 45 thereof. Due to the compression of the binding agent in the compression chamber 40 it is ensured that the conveying compressed air does not flow and/or only to a small part flows towards the intermediate chamber 20.

The conveying device 22 can protrude into the compression chamber 40 in order to compress the binding agent. Moreover, the conveying device 22 designed as a screw conveyor can be designed in an end region 50 in such a manner that the distance of the conveyor spiral is reduced and/or an additional conveyor spiral is provided such that the conveyor spiral in the end region 50 optionally has multiple flights. An opening 14 of the intermediate chamber 20 can be closed, in particular in the end region 50, with a cover element 52. By providing such a cover element 52 it is possible to enlarge the compression chamber 40 such that a compression can already be effected in the end region 50 and thus at least a part of the end region 50 is a component of the compression chamber 40. The cover element 52 can, for example, be displaceable in conveying direction 36 or pivotable in peripheral direction to cover the screw conveyor 22 only partially in the end region 50. Instead of compressing the binding agent by the screw conveyor 22, a compression device for compressing of binding agent can be provided in particular in the end region 50 or in the compression chamber 40. The cover element 52 may also be referred to as a cover.

Figure 2:
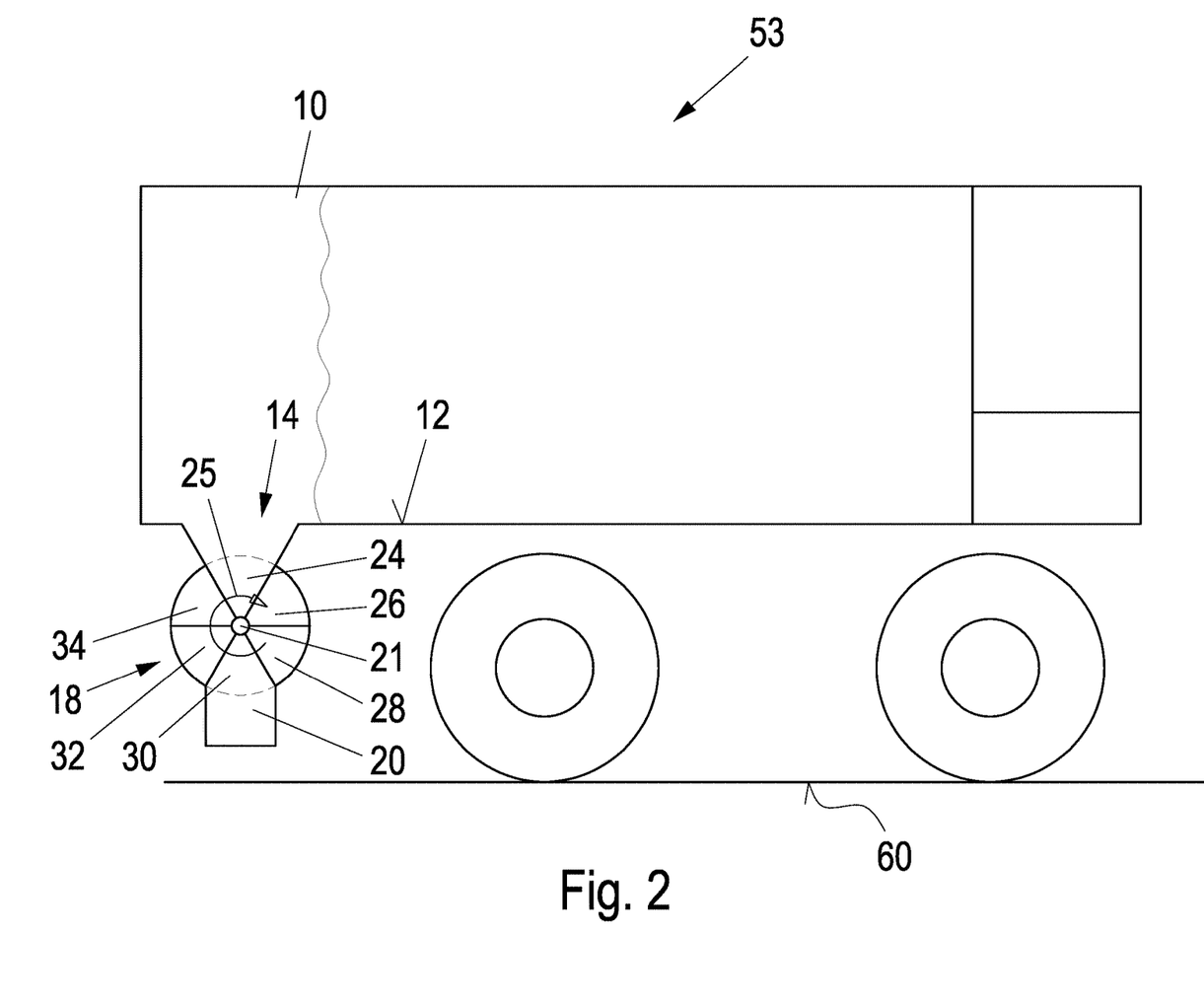
FIG. 2: a schematic partial sectional view of a dry-bulk tanker.
Figure 3:
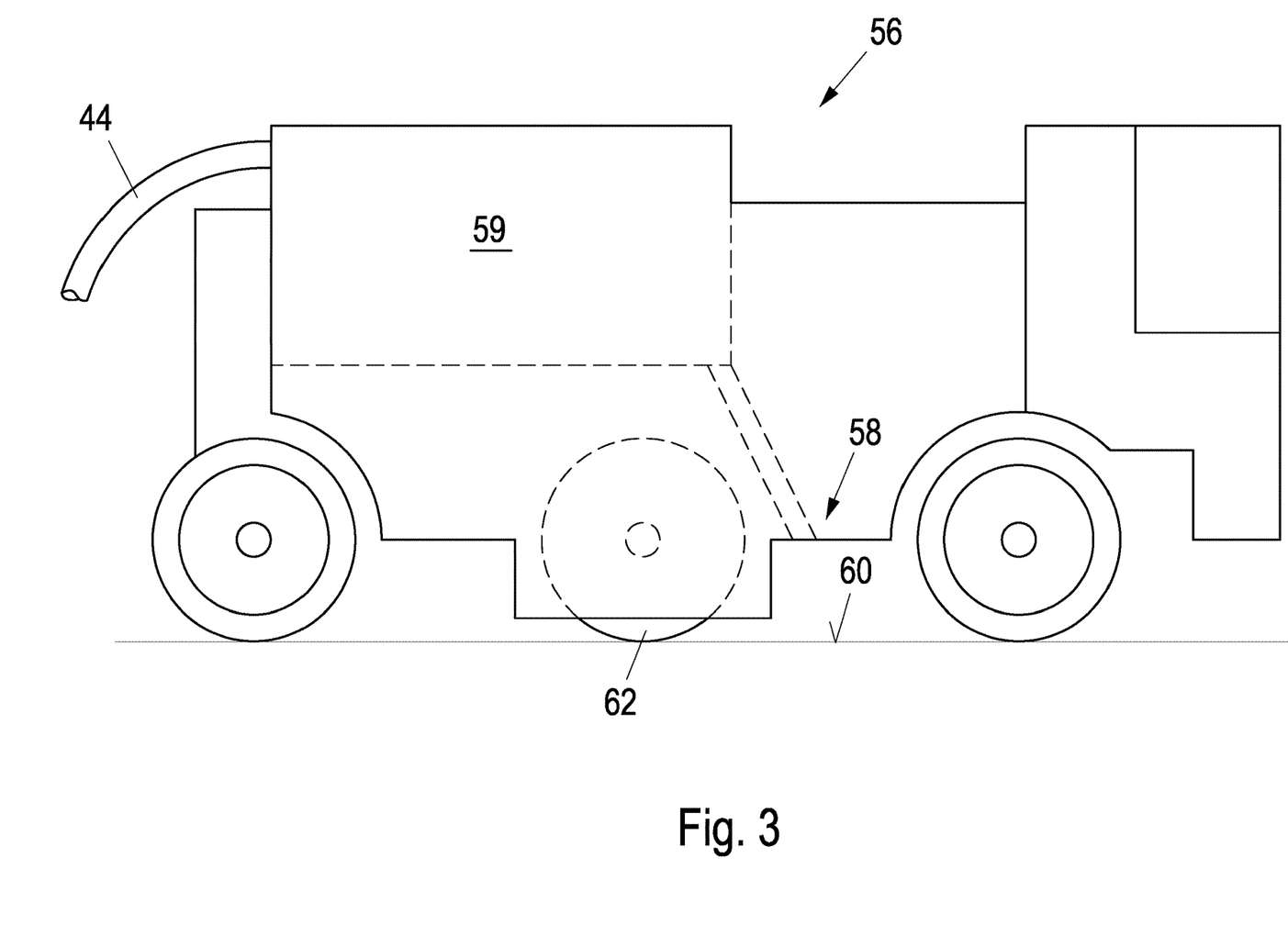
FIG. 3: a schematic side view of a ground working machine.

The dry-bulk tanker 53 presented in FIG. 2 is connected to the ground working machine 56 presented in FIG. 3 via the conveying line 44. The ground working machine 56 comprises the buffer container 59 which is connected to the conveying line 44 and is used for the intermediate buffering of binding agent. A spreading device 58 not present in further detail is connected to the buffer container 59. The spreading device 58 may also be referred to as a spreader. Binding agent is spread on a surface 60 of a ground to be milled-off, via the spreading device 58. The surface 60 is thereupon removed by means of a milling and mixing rotor 62. Such a ground working machine with buffer container 52 is described, for example, in DE 10 2009 008 884.

Figure 4:
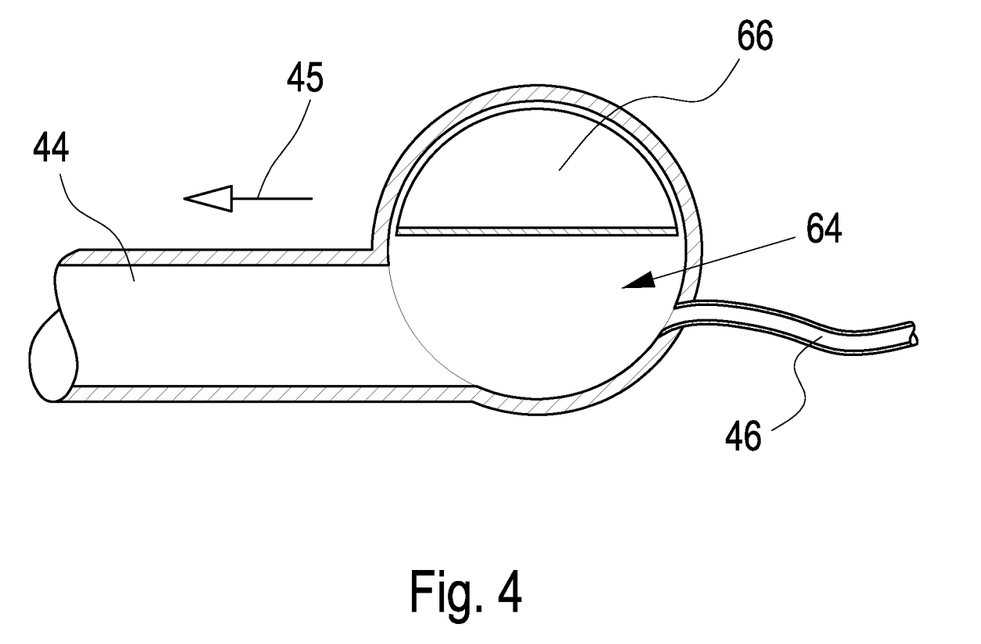
FIG. 4: a schematic side view of an alternative embodiment of the invention in the region of the outlet of the intermediate chamber.

FIG. 4 shows an alternative or additional embodiment of the embodiment of the compression chamber 40 presented in FIG. 1. For example, a closing element 66 can be arranged in the region of an inlet opening 64 of the compression chamber. The closing element 66 closes a part of the channel and thus also causes a reduction in the cross-section. This leads to the compression of the binding agent. The closing element 66 can hereby be designed in its arrangement by displacement or twisting such that the cross-section is modifiable. Furthermore, the closing element 66 can be designed in multiple pieces, wherein it is possible by pivoting, for example, to arrange parts of the closing element above each other in order to enlarge the cross-section. Moreover, the closing element 66 can be inclined in conveying direction 36 such that a continuous compression of the binding agent is effected. When providing the closing element 66 in the region of the inlet opening 64, the compression chamber 40, as optionally presented in FIG. 1, is omitted. The compression chamber 40 is thereupon formed in conveying direction 36 ahead of the closing element 66 in the end region 50 of the intermediate chamber 20.

It is also possible to combine the two embodiments presented in FIG. 1 and FIG. 4. For example, the closing element can be arranged in FIG. 1 in the region of the opening 42. In case of a combination of both embodiments, the tapering of the compression chamber 40 can optionally be smaller.

Depending on the design and shaping of the closing element 66, directing the binding agent flow and/or directing the conveying compressed air flow being fed through the pneumatic line 46 can be effected hereby.

The invention claimed is:

1. A dry-bulk tanker for the provision of binding agent for soil stabilization to a spreader, the dry-bulk tanker comprising:
   a storage container for the binding agent;
   an intermediate chamber connected to the storage container;
   a compression chamber connected to the intermediate chamber;
   a conveyor arranged in the intermediate chamber for conveying the binding agent into the compression chamber;
   a conveying channel connected to the compression chamber and configured to be connected to the spreader; and
   a pneumatic line connected to at least one of the compression chamber and the conveying channel for feeding of conveying compressed air.

2. The dry-bulk tanker of claim 1, wherein:
   the compression chamber includes a cross-section tapered to reduce the cross-section in a conveying direction.

3. The dry-bulk tanker of claim 1, wherein:
   the conveying channel includes a conveying channel longitudinal direction;
   the compression chamber includes a compression chamber longitudinal direction; and
   the conveying channel longitudinal direction and the compression chamber longitudinal direction form an angle greater than 0 degrees, where 0 degrees is defined as a coaxial arrangement.

4. The dry-bulk tanker of claim 3, wherein:
   the angle is greater than 50 degrees.

5. The dry-bulk tanker of claim 3, wherein:
   the angle is greater than 90 degrees.

6. The dry-bulk tanker of claim 1, wherein:
   the conveying channel includes a conveying channel longitudinal direction; and
   the pneumatic line is connected to the conveying channel such that the conveying compressed air flows into the conveying channel substantially in the conveying channel longitudinal direction.

7. The dry-bulk tanker of claim 1, wherein:
the conveyor is a screw conveyor.

8. The dry-bulk tanker of claim 1, further comprising:
a compression device configured to compress the binding agent in the compression chamber, the compression device being arranged in at least one of the intermediate chamber and the compression chamber.

9. The dry-bulk tanker of claim 8, wherein:
the compression device is formed by an end region of the conveyor, the end region being defined in a conveying direction of the conveyor.

10. The dry-bulk tanker of claim 1, wherein:
the conveyor protrudes into the compression chamber.

11. The dry-bulk tanker of claim 1, wherein:
the conveyor is configured to compress the binding agent in a conveying direction in an end region of the conveyor.

12. The dry-bulk tanker of claim 11, wherein:
the conveyor is a screw conveyor having a pitch reducing in the conveying direction in the end region.

13. The dry-bulk tanker of claim 11, wherein:
the conveyor is a double flight screw conveyor in the end region.

14. The dry-bulk tanker of claim 1, wherein:
the intermediate chamber includes an inlet opening connected to the storage container; and
the dry-bulk tanker further includes a cover configured to partially close the inlet opening.

15. The dry-bulk tanker of claim 14, wherein:
the cover is arranged in an end region of the conveyor in a conveying direction.

16. The dry-bulk tanker of claim 1, further comprising:
a closing element arranged between the compression chamber and the conveying channel.

17. The dry-bulk tanker of claim 16, wherein:
the closing element being configured to reduce a passage cross-section between the compression chamber and the conveying channel.

18. The dry-bulk tanker of claim 16, wherein:
the closing element being configured to direct at least one of binding agent flow and conveying compressed air flow.

19. The dry-bulk tanker of claim 1, further comprising:
a rotary feeder between the storage container and the intermediate chamber for conveying the binding agent from the storage container into the intermediate chamber.

20. The dry-bulk tanker of claim 1 in combination with a self propelled ground working machine to form a work train, the self-propelled ground working machine including:
a mixing rotor arranged inside a rotor housing; and
the spreader, wherein the spreader is configured to spread the binding agent.

21. The work train of claim 20, wherein:
the spreader includes a buffer container for the binding agent, the buffer container being connected to the conveying channel of the dry-bulk tanker.

22. A conveying system for a dry-bulk tanker for the provision of binding agent for soil stabilization to a spreader, the conveying system comprising:
an intermediate chamber;
a compression chamber connected to the intermediate chamber;
a conveyor arranged in the intermediate chamber for conveying the binding agent into the compression chamber;
a conveying channel connected to the compression chamber and configured to be connected to the spreader; and
a pneumatic line connected to at least one of the compression chamber and the conveying channel for feeding of conveying compressed air.

23. A method of conveying binding agent in a work train including a ground working machine and a dry-bulk tanker, the method comprising steps of:
conveying the binding agent from a storage container of the dry-bulk tanker into an intermediate chamber of the dry-bulk tanker;
conveying the binding agent from the intermediate chamber into a compression chamber of the dry-bulk tanker;
compressing the binding agent in the compression chamber; and
conveying the binding agent from the compression chamber to the ground working machine.

* * * * *